3,415,840
PYRAZOLE-1-ETHANOL DERIVATIVES
Milton Wolf, West Chester, Pa., assignor to American Home Products Corporation, New York, N.Y., a corporation of Delaware
No Drawing. Filed Oct. 22, 1965, Ser. No. 502,643
9 Claims. (Cl. 260—310)

ABSTRACT OF THE DISCLOSURE

The invention involves the preparation of new carbamate and carbamate esters of pyrazole-1-ethanol possessing useful pharmacological effects as hypoglycemic agents and anti-convulsant agents.

---

This invention relates to pyrazole-1-ethanols and more particularly to the carbamate and carbamate esters of pyrazole-1-ethanol and methods for producing the same.

The compounds of the invention may be illustrated by the general formula:

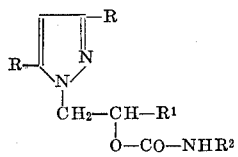

wherein R is intended to represent hydrogen or lower alkyl, $R^1$ representing an aryl or aliphatic radical, preferably phenyl, an aryloxymethyl or an alkoxymethyl group with $R^2$ standing for hydrogen, a lower alkyl or an aryl radical, preferably phenyl; and the pharmaceutically acceptable acid-addition salts thereof.

The products are generally colorless crystals, substantially insoluble in water but soluble in organic solvents such as dimethylformamide, ethanol and the like. When evaluated pharmacologically at dosages of approximately 10 to 100 mg. per kilogram of body weight, the compounds have demonstrated hypoglycemic action as well as central nervous system activity, particularly an anti-convulsant action.

In preparing the compounds described above, a pyrazoleethanol is reacted either with an isocyanate directly or with phosgene and an amine in the presence of an acid acceptor. The reaction may be illustrated by the following flow diagram:

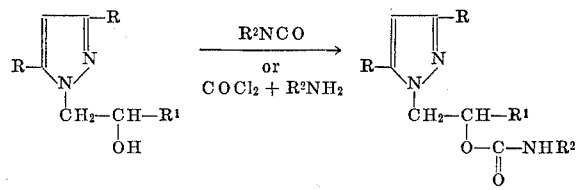

In the above formulae, R, $R^1$ and $R^2$ are intended to have the meanings previously described; with the proviso, however, if $R^2$ is to represent hydrogen in final compound, it would be obvious to select phosgene and ammonia as the proper reactants. The reaction is carried out in an inert organic solvent, for example, benzene or tetrahydrofuran being operable from room temperature to the refluxing temperature of the solvent mixture. The following examples are given essentially for illustrative purposes:

EXAMPLE 1

1-[1-(3,5-dimethyl) pyrazolyl]-3-phenoxypropyl-2-(N-phenyl)carbamate

Phenylisocyanate (2.42 g., 0.0203 m.) is added dropwise with stirring to a refluxing solution of 1-(β-hydroxy-α-phenoxypropyl) - 3,5 - dimethylpyrazole in anhydrous benzene (25 cc.). After the addition is complete, the reaction mixture is refluxed for sixteen hours, cooled, the solid product triturated with cyclohexane, collected by filtration, dried. The yield of crude product is 6.6 g. (89.0%), M.P. 132–4° (uncorr.).

Analysis.—Calc'd for $C_{21}H_{23}N_3O_3$: C, 69.04; H, 6.33; N, 11.50. Found: C, 69.07; H, 6.31; N, 11.47.

EXAMPLE 2

1-phenyl-2-(1-pyrazolyl)ethyl-1-(N-phenyl)carbamate

The reaction of 1-(β-hydroxyphenethyl)-pyrazole (5.0 g., 0.0266 m.) with phenylisocyanate (3.17 g., 0.0266 m.) in a manner similar to that of Example 1 affords the title compound (7.9 g., 96.7%), M.P. 131.0–132° (uncorr.). Recrystallization from ethanol-water gives colorless crystals (7.3 g., 89.4%), M.P. 135.0–136.5° (uncorr.).

Analysis.—Calc'd for $C_{18}H_{17}N_3O_2$: C, 70.34; H, 5.57; N, 13.67. Found: C, 70.33; H, 5.49; N, 13.71.

EXAMPLE 3

2-(3,5-dimethyl-1-pyrazolyl)-1-(p-chlorophenoxymethyl) ethyl carbamate

A solution of 3,5-dimethyl-1-[β-hydroxy-γ-(p-chlorophenoxy)propyl]pyrazole (5.0 g., 0.1785 m.) in tetrahydrofuran (50 cc.) is added dropwise with stirring to a solution of phosgene (16.8 g. of10.5 cc., 0.01784 m.) in tetrahydrofuran. The mixture is stirred overnight at room temperature and triethylamine (2.48 cc., 0.01785 m.) is added. The reaction mixture is poured onto a mixture of ice and concentrated ammonium hydroxide (40 cc.). After stirring for one hour, the solid product is collected by filtration, washed with water, dried at 100° C. The yield of colorless solid is 4.9 g. (84.8%), M.P. 133–50° (uncorr.), recrystallization from ethylacetate-cyclohexane gives colorless crystals (1.75 g., 30.3%), M.P. 158–9° (uncorr.).

Analysis.—Calc'd for $C_{15}H_{18}ClN_3O_3$: C, 55.64; H, 5.60; N, 12.98; Cl, 10.95. Found: C, 55.84; H, 5.67; N, 12.82; Cl, 10.9.

The basic products produced as indicated may be utilized as such or in the form of non-toxic acid addition salts. These are prepared in known manner by reaction of the bases with typical organic or inorganic acids, for example hydrochloric or phosphoric acids or acetic or tartaric acids. In either form, the compounds of the invention are generally utilized with an inert carrier either in the solid or liquid form for oral or parenteral administration.

The temperatures as given in the above examples are intended to represent degrees centigrade.

I claim:

1. A compound having the formula:

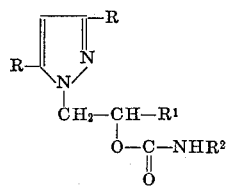

wherein R stands for a member of the group consisting of hydrogen and methyl, $R^1$ stands for a member of the group consisting of phenyl and phenoxymethyl while $R^2$ represents a member of the group consisting of hydrogen and phenyl; and the non-toxic acid addition salts thereof.

2. The compound, 1-[1 - (3,5 - dimethyl)pyrazolyl]-3-phenoxypropyl-2-(N-phenyl)carbamate.

3. The compound, 2 - (3,5-dimethyl-1-pyrazolyl)-1-(p-chlorophenoxymethyl)ethyl carbamate.

4. The compound, 1-phenyl-2-(1-pyrazolyl)ethyl-1-(N-phenyl)carbamate.

5. A substance of the group consisting of a compound having the formula:

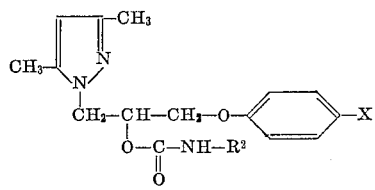

in which X represents a member of the group consisting of hydrogen and chlorine and $R^2$ represents a member of the group consisting of hydrogen and phenyl and the non-toxic acid addition salts thereof.

6. A compound of claim 5; wherein X is hydrogen.
7. A compound of claim 5; wherein X is chlorine.
8. A compound of claim 5; wherein $R^2$ is hydrogen.
9. A compound of claim 5; wherein $R^2$ is phenyl.

References Cited

UNITED STATES PATENTS

| | | | |
|---|---|---|---|
| 2,681,915 | 6/1954 | Gysin et al. | 260—310 |
| 3,190,888 | 6/1965 | Wolf et al. | 260—310 |

OTHER REFERENCES

Burger Medicinal Chemistry, 2nd ed., pp. 376–7, New York, Interscience, 1960.

HENRY R. JILES, *Primary Examiner.*

N. TROUSOF, *Assistant Examiner.*

U.S. Cl. X.R.

167—65